Feb. 27, 1962 L. O. GREELEY 3,022,587
ROAD SCRAPERS
Filed March 16, 1959 3 Sheets-Sheet 1
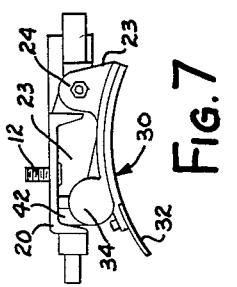
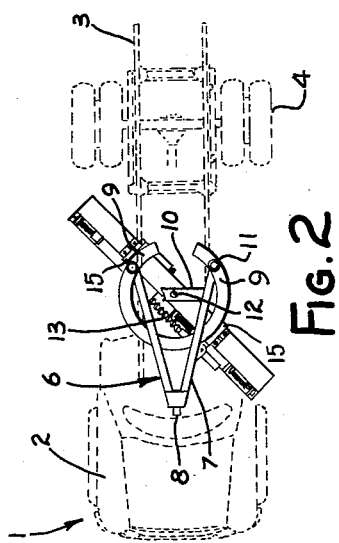
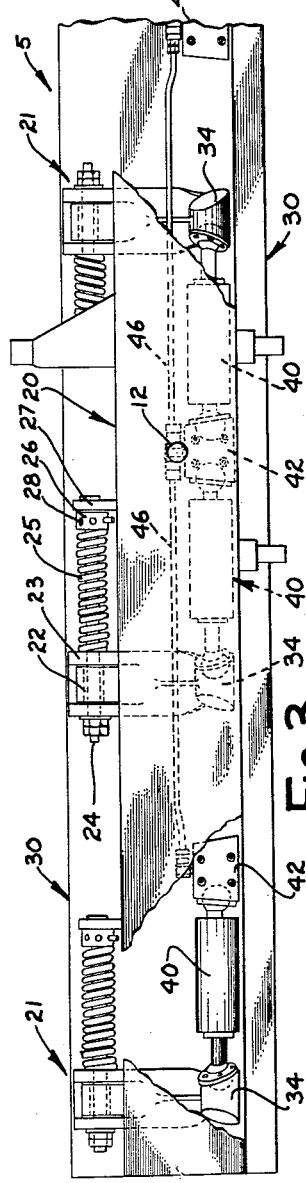
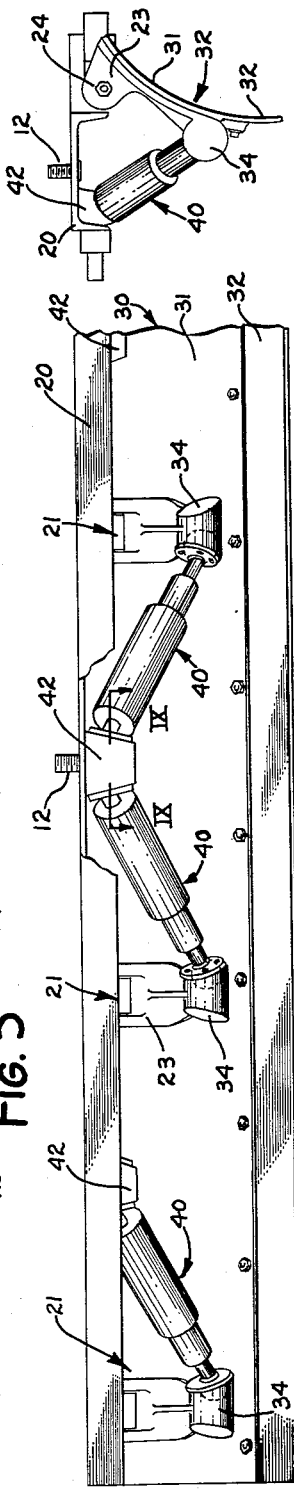
INVENTOR.
LEO O. GREELEY, DECEASED
By CADILLAC STATE BANK, EXECUTOR
BY
ATTORNEYS Feb. 27, 1962 L. O. GREELEY 3,022,587
ROAD SCRAPERS
Filed March 16, 1959 3 Sheets-Sheet 2
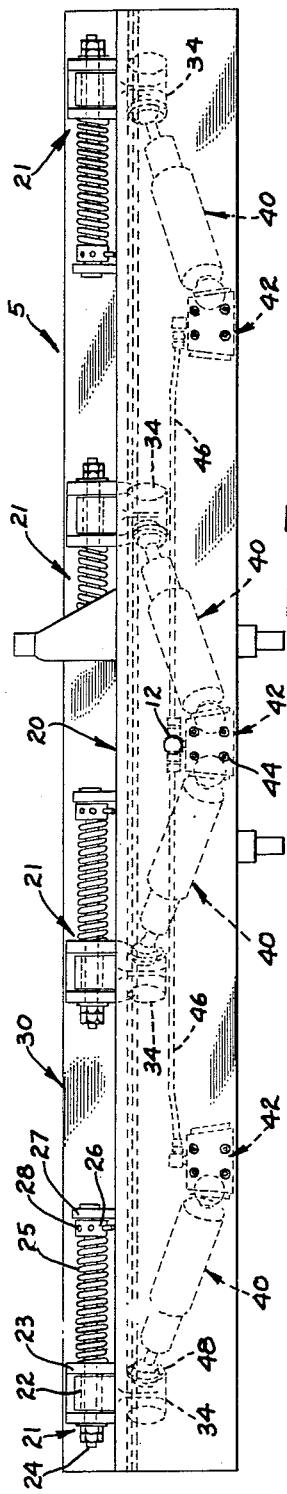
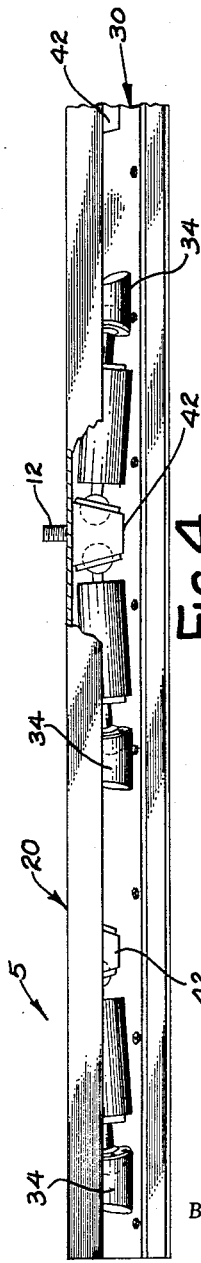
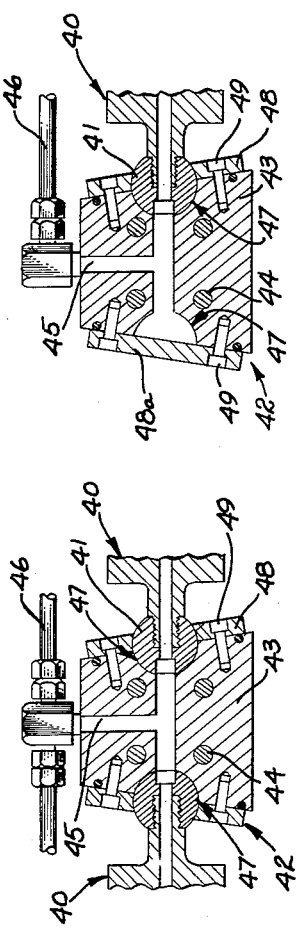
INVENTOR
LEO O. GREELEY, DECEASED
By CADILLAC STATE BANK, EXECUTOR
BY
ATTORNEYS Feb. 27, 1962 L. O. GREELEY 3,022,587
ROAD SCRAPERS
Filed March 16, 1959 3 Sheets-Sheet 3
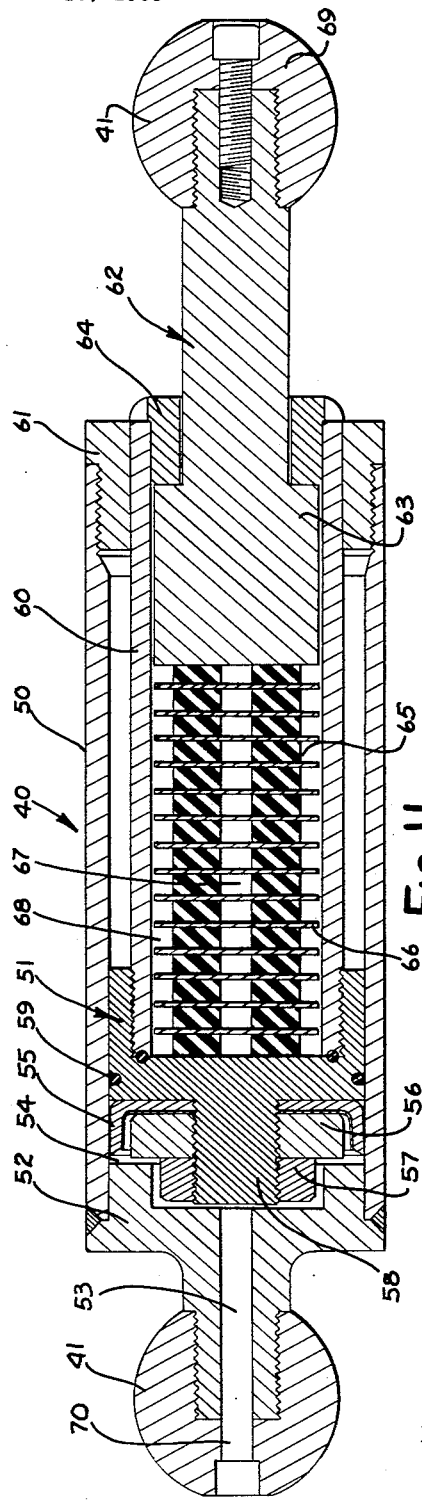
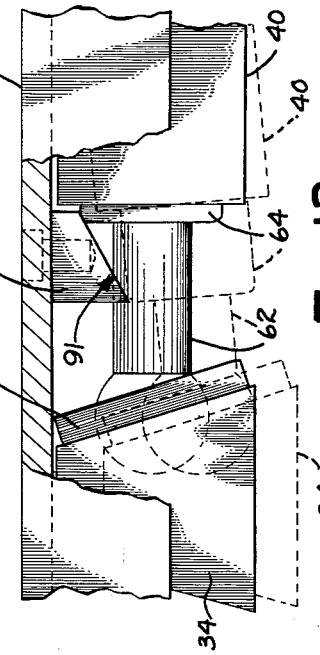
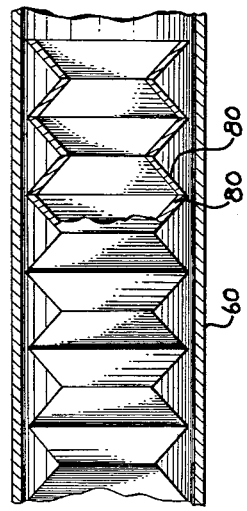
INVENTOR
LEO O. GREELEY, DECEASED
By CADILLAC STATE BANK, EXECUTOR
BY
ATTORNEYS ன
United States Patent Office 3,022,587
Patented Feb. 27, 1962

3,022,587
ROAD SCRAPERS
Leo O. Greeley, deceased, late of Cadillac, Mich., by Cadillac State Bank, executor, Cadillac, Mich., assignor to F. J. McCarthy, Inc., a corporation of Michigan
Filed Mar. 16, 1959, Ser. No. 799,769
8 Claims. (Cl. 37—159)

This invention relates to road scrapers for highway use and more particularly to a scraper unit designed to be secured beneath the frame of a truck body for the purpose of converting the truck from a single purpose vehicle to a multi-purpose vehicle for road maintenance purposes.

For many years equipment has been designed for the purpose of adapting trucks to road maintenance equipment by the application of scraper blade mechanisms beneath the truck. This equipment, however, has had certain disadvantages which, prior to this invention, had not been overcome.

One of the difficulties has been the high silhouette of the scraper unit. The use of vertically extending actuating cylinders for raising and lowering the scraper blade has caused interference with the truck body. This problem has become more acute in recent years with the trend toward less functional and more style conscious truck bodies. In the past it has been customry practice to modify the truck by removing portions of the running board and other body parts to permit the scraper equipment to be rotated in azimuth to the angle required for proper operation. With the introduction of the more highly stylized bodies, such modifications have become impractical and frequently impossible. While there has been introduced to the market certain units which overcome this difficulty by the use of a low silhouette scraper design, these units have been expensive. One of the objects of this invention is to produce a scraper unit of low silhouette and low initial and operating cost.

Another problem often experienced with road scraper equipment of this type has been that of dependability. This equipment is used under extremely adverse conditions where it is exposed to dirt, moisture and corrosive chemicals such as salt, or calcium chloride. Many designs which appear practical on the drafting board have proved wholly inoperative due to this environment. This equipment has overcome these difficulties by totally enclosing all important operating parts requiring a close precise clearance for proper functioning.

Another difficulty which has been experienced is that of failure of the blade to return to raised or retracted position in the event of a power failure. Many times equipment of this type has been stranded on the highway because the hydraulic or pneumatic blade operating system has failed and as a result the blade could not be retracted to permit the equipment to return to base. This invention overcomes this difficulty by providing hydraulic pressure for maintaining the blade in extended or operating position and coil springs which automatically raise the blade upon cessation of the force keeping the blade extended. Thus, should failure occur in the hydraulic or pneumatic system holding the blade extended, the springs will automatically retract the blade, permitting the equipment to return to base for repair.

Another difficulty which has long delayed development in this field is that of providing sufficient scraping pressure to do an effective job while permitting the equipment to automatically release under shock load conditions. Such conditions occur when the equipment strikes a solid or fixed object such as a piece of broken pavement, an embedded rock, a tree stump or an object frozen in the ground. If no means is provided for release of the blade under these circumstances, the blade will normally be damaged and sometimes the blade retaining mechanism will be injured. An even more drastic result is the necessity for reduced operating speeds. Conventional equipment having no effective release mechanism must be operated at very reduced speeds. If higher speeds of operation are used and the equipment strikes a fixed object, the result is frequently that of upsetting the equipment and injury of personnel. This invention overcomes this difficulty by permitting the equipment to automatically release under such circumstances. Thus, it can be operated at speeds several times that of present equipment. This gives the equipment much greater capacity because a single unit can service two and often more times as much highway as was possible with any known previous equipment.

This equipment has another advantage in that it is made fully automatic. That is, the operator, without leaving the cab, is enabled to raise or lower the blade, to control its horizontal angular position, and to adjust its lateral tilt with relation to the frame of the truck. Never before has any piece of equipment of this type provided complete control. Since the operator does not have to manually swing the blade to adjust its azimuth position or manually lock the blade's position after adjustment, a single operator may use this equipment, thus eliminating the necessity for a helper. This, again, reduces the cost of maintaining a highway.

These and other objects and purposes of this invention will be understood immediately by those acquainted with the design and operation of road maintenance equipment upon reading the specification and the accompanying drawings.

In the drawings:

FIG. 1 is a side elevation view of a truck equipped with this invention;

FIG. 2 is a plan view of a truck equipped with this invention;

FIG. 3 is a fragmentary, partially broken, plan view of the scraper assembly in retracted position;

FIG. 4 is a fragmentary, partially broken, rear elevation view of the scraper assembly in retracted position;

FIG. 5 is a plan view of the scraper assembly in lowered or extended position;

FIG. 6 is a fragmentary, partially broken, rear elevation view of the scraper assembly in extended or lowered position;

FIG. 7 is an end elevation view of the scraper assembly in retracted or raised position;

FIG. 8 is an end elevation view of the scraper assembly in lowered or extended position;

FIG. 9 is an enlarged, fragmentary, central sectional view taken along the plane IX—IX of FIG. 6;

FIG. 10 is an enlarged, fragmentary, central sectional view taken on a horizontal plane through one of the blocks used at the left end of the scraper as the scraper is illustrated in FIG. 3;

FIG. 11 is an enlarged, central sectional view of one of the hydraulic actuators for the scraper assembly;

FIG. 12 is a fragmentary, central sectional view of a modified shock absorber unit for the actuator illustrated in FIG. 11;

FIG. 13 is a partially broken, fragmentary, rear elevation view of a modified mounting for the actuators of this invention.

In executing the objects and purposes of this invention, there has been provided a scraper assembly having a main carrying beam which is pivotally secured to a truck body beneath its frame. Secured to this beam for vertical pivotal movement is a scraper blade biased into raised or retracted position by a plurality of coil springs. A plurality of hydraulically operated pistons are also provided. These, when extended, lower the blade into scraping position against the bias of the coil springs. These pistons contain a cushion unit which, if force is applied to it gradually, will sustain extremely high pressures but which, if subjected to a sudden shock loading, will compress, thereby affording the scraper blade instantaneous release to pass over a fixed object.

Referring specifically to the drawings, the numeral 1 indicates a truck having a cab 2 and a frame 3. The truck is supported by conventional wheels 4. Mounted to the frame 3 intermediate the wheels 4 is a scraper assembly 5. The scraper assembly is secured to the truck by an A-frame mounting unit 6 having a pair of tie bars 7 and a cross bar 10. The tie bars 7 converge forwardly and are joined to the truck by a universal joint 8. At their rearward end, the tie bars 7 are attached to an arcuate frame member 9. They are also joined by the cross bar 10. The rearward ends of the arcuate frame 9 are secured to the truck by tilt cylinders 11. Secured to the mounting unit 6 at the center of the cross bar 10 by means of the pivot pin 12 is the scraper assembly 5. The scraper assembly 5 may rotate in a horizontal plane above pivot pin 12 and its horizontal or azimuth position is regulated by the azimuth power cylinder 13. The scraper assembly 5 may be locked in any selected azimuth position by the locking clamps 15. These are mounted on scraper assembly 5 and in locking position tightly grip the arcuate frame member 9. The tilt cylinders 11, azimuth power cylinder 13 and locking clamps 15 are all remotely operated from the cab of the truck and require no exterior manual attention.

Defining the upper extremity of the scraper assembly is a beam 20. The beam 20 is the load carrying member of the scraper assembly. Spaced at substantially uniform intervals along the length of the beam 20 and rigidly secured thereto are hinge brackets 21 (FIG. 3). Each of the hinge brackets 21 has a fixed trunnion 22 which is rigidly secured to the beam 20 and a blade bracket 23. A stud arm 24 extends through both the fixed trunnion and the blade bracket and forms the hinge pin of the hinge bracket 21. The hinge stud 24 projects a substantial distance from one side of the hinge bracket 21 and this extended portion is surrounded by a coil spring 25. One end of the coil spring is firmly secured to the blade bracket 23. The other end is secured to the tension collar 26 adjacent a point where the hinge stud 24 is rotatably seated in the journal 27. The tension collar 26 has a plurality of holes 28 by which it may be rotated with relation to the hinge stud 24, thereby increasing or decreasing the tension of the coil spring 25. By placing a pin in the appropriate one of these holes, the position of the tension collar 26 may be locked or stabilized at the point required to give the spring 25 the desired tension.

Beneath the beam 20 and extending the full length thereof, is a blade assembly 30 consisting of a mold board 31 and a replaceable scraper element 32 (FIG. 6). The use of a detachable scraper element 32 is conventional and is provided so that it may be replaced without the necessity of replacing the entire mold board structure, since, by the very nature of its use, its incident of wear is high. The several blade brackets 23 are rigidly secured to the mold board 31. Thus, the tension applied to the coil springs 25 acting upon the blade brackets 23 urges the blade 30 downwardly, that is, into extended or operating position.

On the lower ends of each of the blade brackets 23 is an anchor head 34. These will be described more fully hereinafter.

The blade 30 is moved into extended or scraping position by a plurality of power cylinders or actuators 40. Each of the actuators 40 has a terminal ball 41 on both ends. A plurality of actuator mounting blocks 42 are secured to the lower surface of the beam 20. For simplicity of manufacture, all actuator mounts 42 are basically identical although the center one services two actuators 40 while the two end ones only service a single actuator. Each of the blocks 42 consists of a main body 43 secured to the beam 20 by screws 44. Internally, the body 43 has hydraulic supply channels 45 communicating at one point with a main supply line 46. The main supply line 46 is in communication with a suitable source of fluid under pressure either hydraulic or pneumatic. The movement of fluid through the main supply line 46 is regulated by suitable controls in the cab of the truck. Thus, the operator can raise and lower the blade without leaving the driver's seat. This source and pressure producing system is not illustrated as it is conventional and many types of equipment suitable for this purpose may be purchased on the market.

The supply channel 45 has oppositely extending branches which open into hemispherical sockets 47. The sockets 47 open through opposite faces of the block 42. These sockets 47 are designed to receive the terminal balls 41 of the actuators 40. Designed to seat closely about the terminal balls 41 are cap plates 48. These are so shaped that the aperture in them for receiving the terminal balls 41 converges outwardly to form a segment of sphere which seats snugly about the ball. The cap plates 48 are secured to the block 42 by screws 49. With the cap plate 48 seated about the ball and secured tightly to the block 42, the ball is locked against displacement from the block and a substantially fluid tight fit is formed between the ball 41 and both the walls of the socket 47 and the aperture in the plate 48. This fit, however, is not so tight as to prevent limited rotary movement of the ball relative to the block.

As will be explained more fully hereinafter, the ball 41 has a central channel for receiving and discharging hydraulic fluid to and from the supply channel 45. Where only an actuator 40 is mounted to one of the blocks 42, the socket 47 in the unused face of the block 42 is closed by a cap plate 48a. The cap plate 48a is similar to the cap plate 48 except for the omission of the central aperture and thereby forms a seal over the unused socket 47 to prevent the escape of oil or air, as the case may be.

The anchor heads 34 on the lower ends of the blade brackets 23 also have hemispherical sockets in opposite faces for receiving one of the terminal balls 41 of the actuators 40. Again, the unit is equipped with a ring-like cap plate 48 for locking the terminal ball 41 to the head 34. The anchor heads 34, however, only have the socket in one face, since the other face is never used. However, in a construction in which both faces are used, the same type of arrangement could be employed as that described for the blocks 42.

All actuators 40 are identical. Each has a tubular housing 50 within which is a piston 51 designed for sliding longitudinal movement relative to the housing. At the end adjacent the piston 51 the housing is closed by a terminal fitting 52 having a central fluid passage 53. Between the terminal fitting 52 and the piston 51 is a pressure chamber 54 sealed by a flanged gasket 55. The gasket 55 is seated by means of a backing washer 56 and locking nut 57. These are threadedly mounted on a stud 58 projecting into the pressure chamber 54 from the piston 51. As an extra precaution against leakage of the fluid from the pressure chamber, the piston 51 is surrounded by an O-ring 59.

Extending through the opposite end of the housing 50 and threadedly secured to the piston 51 is a tubular casing 60. One end of the tubular casing 60 is externally threaded and engages the internally threaded annular flange on the piston 51. The casing 60 is slidable through a gland nut 61 threaded into the other end of the housing 50. A plunger 62 extends through the external end of the casing 60 and at this end is surrounded by a closure collar 64. The inner end of the plunger has a head 63. The plunger 62 and its head are slidable within the casing 60.

The plunger head 63 is spaced a substantial distance from the piston 51 and within the casing 60 this area is occupied by a plurality of aligned annular compressible disks 65. These are of a suitable resilient material such as rubber, natural or synthetic. The disks 65 are spaced by rigid separators 66 which, preferably, are metallic disks. It will be noted that the compressible disks 65 each have a central aperture 67 and are of such external diameter that they leave a substantial space 68 between their circumferential wall and the inside face of the casing 60. This permits the disks, when subjected to loadings in excess of a predetermined value, to reduce their thickness by deforming or spreading radially. The presence of the separators 66 stabilizes the column of compressible disks 65 within the central chamber of the casing 60, thus preventing them from sliding sideways and becoming misaligned. To maintain a stable column, the disks 65 and separators 66 are joined by any suitable means such as an adhesive.

The outer end of the plunger 62 is of reduced diameter and is externally threaded to receive one of the terminal balls 41. The terminal ball 41 is internally threaded and also has a central opening for receiving a cap screw 69. The cap screw serves to further anchor the ball to the plunger 62.

The terminal fitting 52 also has an outwardly projecting portion of reduced diameter and externally threaded to receive one of the terminal balls 41. In this case, however, the cap screw is omitted and the opening normally occupied thereby serves as a fluid channel 70 communicating with the fluid channel 53.

It will be noted by reference to FIGS. 3 and 4 that when the scraper blade is in elevated or retracted position the actuators 40 are aligned or almost aligned longitudinally of the beam 20. However, it will be noted in elevation view (FIG. 4) that they extend downwardly at a slight angle from their point of attachment to the beam 20 to their point of attachment to the blade. Thus, they are not on dead center and when hydraulic fluid is applied to them the pressure exerted on the pistons 51 will force the anchor heads 34 on the blade assembly 30 to separate from the blocks 42 on the beam 20. This will cause the blade assembly to pivot downwardly against the pressure of the springs 25.

While the actuators 40 have the least leverage advantage in fully retracted position, this is the position in which there is the least demand upon them. When they are in their extended position, they have the greatest leverage advantage and this is the position in which the greatest demand is made upon them because the scraper blade is then in operating position. This arrangement permits the blade to be fully retracted for maximum road clearance and yet the entire operating assembly for raising and lowering the blade is situated below the beam 20. This assures a low, flat silhouette for the scraper assembly 5, eliminating interference with the structure of the truck on which it is mounted.

Since a plurality of the power cylinders 40 may be utilized to operate a single blade, adequate downward force can be applied to assure proper scraping action. Further, since this force is applied at a plurality of points along the length of the blade rather than merely at its ends, the blade itself can be of lighter construction and yet maintain a straight, even, and effective scraping edge against the work surface.

It is not desirable to attempt to use the hydraulic system as a sudden release mechanism should the blade strike a fixed object. Hydraulic fluid itself is inelastic and thereby can provide no cushioning effect within itself. Because of its high inertial value and the difficulty of releasing large quantities of fluid rapidly in response to the high shock loads imposed by contact with a solid object, it is essential that the necessary cushioning effect be provided by some other means. In this case, it is accomplished by means of the resilient disks 65 and spacers 66. If the blade strikes a fixed object, the sudden build up of excessively high pressure tending to collapse the actuator 40 will cause the compressible disks 65 to flatten or spread radially. This in turn permits the plunger head 63 to telescope into the casing 60 with the result that the blade can rise sufficiently to pass over the object without injury or transmission of the shock to the truck.

Of substantially equal importance is the fact that the blade, having passed over the fixed object, will immediately return to its original scraping position. In doing so it will not vibrate or chatter, a common cause of so-called washboard type road surfaces. This ability to maintain a firm and constant grading pressure permits the scraper unit to be operated at much higher road speeds than conventional equipment without vibration or chatter. When conventional equipment is used at high road speeds, it frequently produces a washboard surface due to chatter and improper contact with the road surface.

The use of this emergency pressure release system permits equipment incorporating this invention to be operated at high speeds without danger to operating personnel or deterioration in the quality of the work done. Such equipment can be effectively operated over a road surface at 30, 40 or even 50 miles per hour. Such speeds have never been possible before. With the advent of more and wider highways, it is essential that each piece of equipment be operated more efficiently and at higher speed if the cost of maintenance and service of these highways is to be kept within any reasonable economic limits.

The compressible disks 65, while resilient, must be firm so that they do not compress or tend to gradually creep under normal operating loads. Thus, a material having a resiliency of approximately the equivalent of 65 durometer rubber or harder must be used. The relationship between resiliency, thickness and diameter must be carefully balanced to produce the desired result. When material of this type is used and the proper relationships are maintained, it will not deflect or creep under the normal, predetermined loads. However, if the load rises suddenly and exceeds the predetermined value at which the material will start to travel or deflect, the compression in the material will automatically permit shortening of the actuator practically instantaneously. Thus, the blade will be enabled to move up and over the fixed object before injury occurs to the blade or the shock of striking the fixed object can be transmitted to the truck.

It has been found that alternately reversed frustoconical washers 80 may be substituted for the rubberlike disks 65 (FIG. 12). The size, wall thickness and hardness of the washers 80 will be predetermined at the point at which they will flex to permit pressure relief by shortening of the actuators when compressive loads exceed a predetermined value.

FIG. 13 illustrates another modification of the invention. In this modification a tilting cam 90 is applied to the undersurface of the beam 20 where it will make contact with the exterior end of the casing 60 when the actuator 40 is substantially retracted. Since the end of the casing 60 strikes the inclined face 91 of the cam immediately upon initiation of its extending movement, the actuator 40 will be forced sharply outwardly away from the beam 20 to rapidly gain leverage advantage. In this construction the actuator is so designed that the last bit of retraction movement will completely free the shock absorbers 65 or even perhaps slightly stretch them, permitting the initial extending movement of the casing 60 to be made while this slack is being absorbed. This effects an outwardly pivoting of the actuator 40 by the cam 90 before positive extension of the plunger 62 begins.

Other modifications of this invention may be made. Such of these modifications as do not depart from the principles of the invention are to be considered as in-

What is claimed is:

1. In a surface scraper unit for mounting beneath a truck, the combination comprising: a beam and means securing said beam to said truck; a scraper blade and a plurality of hinges pivotally securing said blade to said beam; a plurality of springs urging said blade into retracted position adjacent said beam; a plurality of fluid operated actuators each having one end mounted to and beneath said beam and the other end mounted to said blade and when extended by fluid pressure pivoting said blade downwardly into extended position; said actuators in both retracted and extended position being entirely beneath said beam and behind and below the top of said blade and extending generally parallel to the lengthwise plane of said blade when said actuators and blade are retracted.

2. A surface scraper unit as recited in claim 1 wherein a compressible unit is mounted in each of said actuators adapted to permit rapid retraction of said actuators when compressive forces applied thereto exceed a predetermined value.

3. In a surface scraper unit for mounting beneath a truck, the combination comprising: a beam and means securing said beam to said truck; a scraper blade and a plurality of hinges pivotally securing said blade to said beam; a plurality of coil springs urging said blade into retracted position adjacent said beam; each of said springs having one end secured to the bracket portion of said hinges secured to said blade and the other end secured to said beam; said springs being beneath said beam and extending lengthwise thereof; a plurality of fluid operated actuators each having one end mounted to and beneath said beam and the other end mounted to said blade and when extended by fluid pressure pivoting said blade downwardly into extended position; said actuators in both retracted and extended position being entirely beneath said beam and behind and below the top of said blade and extending generally parallel to the lengthwise plane of said blade when said actuators and blade are retracted.

4. In a surface scraper unit for mounting beneath a truck, the combination comprising: a beam and means securing said beam to said truck; a scraper blade and a plurality of hinges pivotally securing said blade to said beam; a plurality of springs urging said blade into retracted position adjacent said beam; each of said hinges having a hinge pin extending outwardly from one side of said hinge; a plurality of coil springs each surrounding one of said projecting ends of said hinges; each of said springs having one end secured to the bracket portion of said hinges mounted on said blade and the other end secured to said beam and urging said blade into retracted position adjacent said beam; said springs being beneath said beam and extending lengthwise thereof; a plurality of fluid operated actuators each having one end mounted to and beneath said beam and the other end mounted to said blade and when extended by fluid pressure pivoting said blade downwardly into extended position; said actuators in both retracted and extended position being entirely beneath said beam and behind and below the top of said blade and extending generally parallel to the lengthwise plane of said blade when said actuators and blade are retracted.

5. In a surface scraper unit for mounting beneath a truck, the combination comprising: a beam and means securing said beam to said truck; a scraper blade and a plurality of hinges pivotally securing said blade to said beam; a plurality of springs beneath said beam urging said blade into retracted position adjacent said beam; a plurality of fluid operated actuators each secured to both said beam and said blade and situated entirely beneath said beam, said actuators when extended pivoting said blade downwardly in extended position; said actuators in both retracted and extended position being behind and below the top of said blade; said actuators being disposed generally parallel to the lengthwise plane of said blade when said actuators and blade are retracted whereby the top of said beam is the highest silhouette of said scraper blade and beam assembly.

6. A surface scraping unit as described in claim 5 wherein each of said actuators has a release mechanism enclosed therein adapted to permit said actuator to contract when a predetermined compressive force is exerted upon it.

7. In a surface scraper unit for mounting beneath a truck, the combination comprising: a beam and means securing said beam to said truck; a scraper blade and a plurality of hinges pivotally securing said blade to said beam; a plurality of springs urging said blade into retracted position adjacent said beam; a plurality of fluid operated actuators; a first ball and socket mounting one end of each of said actuators to said beam; a second ball and socket mounting the other end of each of said actuators to the back surface of said scraper blade; each of said first ball and sockets having fluid conduit means for connecting the interior of the associated actuator with a source of fluid; said actuators, when extended by fluid pressure, pivoting said blade downwardly into extended position; said actuators in both retracted and extended position being entirely beneath said beam and behind and below the top of said scraper blade and extending generally parallel to the lengthwise plane of said blade when said actuators and blade are retracted.

8. In a surface scraper unit for mounting beneath a truck, the combination comprising: a beam and means securing said beam to said truck; a scraper blade and a plurality of hinges pivotally securing said blade to said beam; a plurality of springs urging said blade into retracted position adjacent said beam; a plurality of fluid operated actuators; a first ball and socket mounting one end of each of said actuators to said beam; a second ball and socket mounting the other end of each of said actuators to the back surface of said scraper blade; each of said first ball and sockets having fluid conduit means for connecting the interior of the associated actuator with a source of fluid; compressible shock absorbing means mounted within each of said actuators adapted to permit partial retraction of said scraper blade upon striking a fixed object; said actuators, when extended by fluid pressure, pivoting said blade downwardly into extended position; said actuators in both retracted and extended position being entirely beneath said beam and behind and below the top of said scraper blade and extending generally parallel to the lengthwise plane of said blade when said actuators and blade are retracted.

References Cited in the file of this patent

UNITED STATES PATENTS

| | | |
|---|---|---|
| 7,706 | Ray | Oct. 8, 1850 |
| 1,733,123 | Jackoboice | Oct. 29, 1929 |
| 1,749,465 | Caskin | Mar. 4, 1930 |
| 1,954,427 | Platz | Apr. 10, 1934 |
| 1,966,936 | Schermerhorn | July 17, 1934 |
| 2,432,717 | Berger | Dec. 16, 1947 |
| 2,515,188 | Brennan | July 18, 1950 |
| 2,578,727 | Mork | Dec. 18, 1951 |
| 2,708,110 | Clay | May 10, 1955 |
| 2,801,010 | Willison | July 30, 1957 |